United States Patent [19]

Wang

[11] Patent Number: 4,528,975

[45] Date of Patent: Jul. 16, 1985

[54] STEAM COOKING RACK AND METHOD

[76] Inventor: Gung H. Wang, 8200 Indiana Ave., Chicago, Ill. 60619

[21] Appl. No.: 538,327

[22] Filed: Oct. 3, 1983

[51] Int. Cl.³ .............................................. F24D 1/00
[52] U.S. Cl. .................................... 126/369; 99/417; 99/448; 99/645; 220/4 C; 220/401; 220/19; 426/510; D7/356
[58] Field of Search ............... 126/369, 348, 377, 378; 99/413, 417, 448, 645; 220/19, 17.2, 92, 401, 287, 4 D, 4 C; 219/401, 415, 438, 439; D7/356; 426/510, 511

[56] References Cited

U.S. PATENT DOCUMENTS

| 198,317 | 12/1877 | Smith | 126/369 |
|---|---|---|---|
| 566,884 | 9/1896 | Amos | 126/369 |
| 639,474 | 12/1899 | Welty | 99/413 |
| 771,574 | 10/1904 | Renn | 126/369 |
| 896,708 | 8/1908 | Bruce |  |
| 918,656 | 4/1909 | Chase | 126/369 |
| 1,283,389 | 10/1918 | Wills et al. | 220/19 X |
| 1,694,378 | 12/1928 | Goodwin | 126/369 X |
| 1,751,974 | 3/1930 | Brucker | 126/369 |
| 2,368,141 | 1/1945 | Johnsson | 126/369 X |
| 3,212,426 | 10/1965 | Lewis | 99/339 |
| 3,289,571 | 12/1966 | Lewus | 126/369 X |
| 4,316,447 | 2/1982 | Foreman | 126/369 |

Primary Examiner—Randall L. Green
Attorney, Agent, or Firm—Hill, Van Santen, Steadman & Simpson

[57] ABSTRACT

An open framework rack has shoulders of progressively greater width for supporting within the rack cooking receptacles of progressively greater width one spaced above the other for efficient steam cooking within a steam chamber. The rack desirably comprises wireform risers providing stepped terraces. A plurality of connecting rings secure the risers in the rack. A multichannel/rib adapter is adapted for supporting a cooking receptacle on the rack or on the bottom of a steam chamber. The rack is adapted for handling by upstanding ears thereon or by a bail removably engaging the ears.

12 Claims, 5 Drawing Figures

STEAM COOKING RACK AND METHOD

The present invention relates to the art of steam cooking, and is more particularly concerned with a new and improved rack adapted for supporting a plurality of cooking receptacles at different elevations in a steam chamber, and a method of cooking utilizing such a rack.

Steam cooking has been long practiced in many cultures. Where food has its own wrapper, e.g. some vegetables, fruits and unskinned meat, it may be cooked directly on or in a heat source and the internal moisture content converted to steam for effecting the cooking. Often the food may be wrapped in a steam retaining wrapper, such as aluminum foil, some plastic films, or the like, to assure steam retention and accelerated cooking.

For domestic kitchen cooking, food has often been steamed by placing it in a vessel in which the food is supported above a supply of water which is caused to boil and thereby to generate steam for enveloping and cooking the food. A wire basket arrangement for this purpose is disclosed in U.S. Pat. No. 896,708. Perforated utensils such as colanders, strainers, and the like have also been used to support food above or in water in a cooking utensil.

A major disadvantage of cooking in this manner is that as the cooking proceeds and juices are released from the food, they will escape into the water and may be lost if the water is not subsequently used and the nutrients in the juices salvaged in soup, gravies or the likes. Moreover, much of the flavor of food is carried in the natural liquid content of the food, so that when the juices drip out, some or much of the natural food flavor may be sacrificed.

Although in U.S. Pat. No. 3,212,426, it is suggested that the juices or drippings from the food be salvaged in a pan below the food being cooked, it is still presumed that the food juices will drip away from the food and, as already indicated, this deprives the food of flavor that is carried in the natural liquid content thereof. It may also be noted that in this U.S. Pat. No. 3,212,426, a multipart food supporting assembly is provided which complicates cooking procedures to the point where many cooks will reject the apparatus due to its complexity, liability of damage to various parts so that they will not fit together properly, and the ever-present liability of misplacement or loss of parts so that the apparatus may become largely or wholly inoperable. This patent arrangement is also quite limitative of the width or diameter of cooking receptacles that may be utilized.

An important object of the present invention is to improve the art of steam cooking by maximizing steam cooking efficiency with simple, efficient rack means enabling new and improved steam cooking methods.

To this end, the present invention provides for use within a steam cooking chamber an open framework rack of a height for supporting cooking receptacles at a plurality of elevations in the chamber, the rack having an intermediate terrace structure providing generally upwardly facing first shoulder means of substantially smaller width than an upwardly extending substantially larger width portion of the rack which leaves a clear space above the terrace structure, and substantially wider upwardly facing second shoulder means provided by the wider portion of the rack, so that a relatively narrow cooking receptacle is adapted to be supported by the first shoulder means and a relatively wider cooking receptacle is adapted to be supported by the second shoulder means at an elevation above the narrow cooking receptacle, and if an upper end part of the narrow receptacle extends to a greater width then the first shoulder means such upper end part is adapted to be accommodated in the space above the terrace structure, or a casserole, dish or pan may be supported on its bottom directly on said terrace structure.

There is also provided by the present invention for use in a steam cooking chamber an adapter having channel ribs radiating from a center with ends of the channels opening from the perimeter of the adapter, the adapter extending to a diameter for providing stable support for a cooking receptacle supported on the adapter within the chamber.

The present invention also provides a method of cooking in a steam chamber, comprising mounting within the steam chamber an open framework rack of a height and structure for supporting cooking receptacles of different widths at a plurality of elevations, supporting a relatively narrower first cooking receptacle on first generally upwardly facing shoulder means on the rack at a terrace on the rack extending toward a wider upwardly extending portion of the rack, supporting a wider second cooking receptacle in spaced relation above the terrace and above the first cooking receptacle on second shoulder means provided by the wider upwardly extending portion of the rack, and generating cooking steam in the chamber and subjecting said receptacles and any food contained therein to the steam.

Other objects, features and advantages of the invention will be readily apparent from the following description of preferred embodiments thereof, taken in conjunction with the accompanying drawing, although variations and modifications may be effected without departing from the spirit and scope of the novel concepts of the disclosure, and in which.

Figure 1:
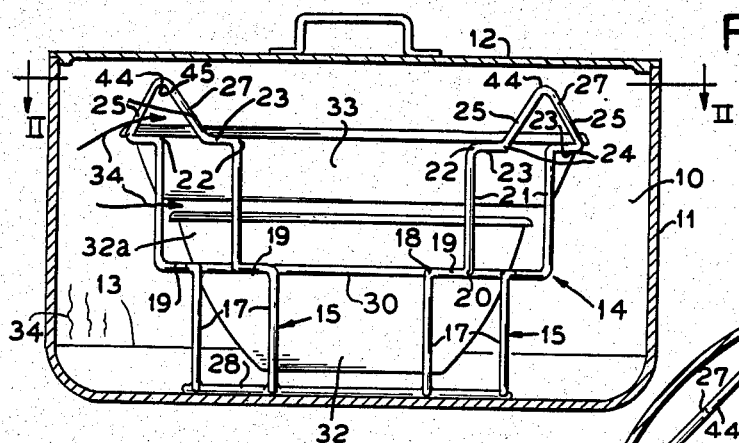
FIG. 1 is a vertical sectional view through a steam cooking assembly depicting in elevation the new and improved open frame rack of the present invention and showing how the rack is adapted for practicing the method of the present invention.
Figure 4:
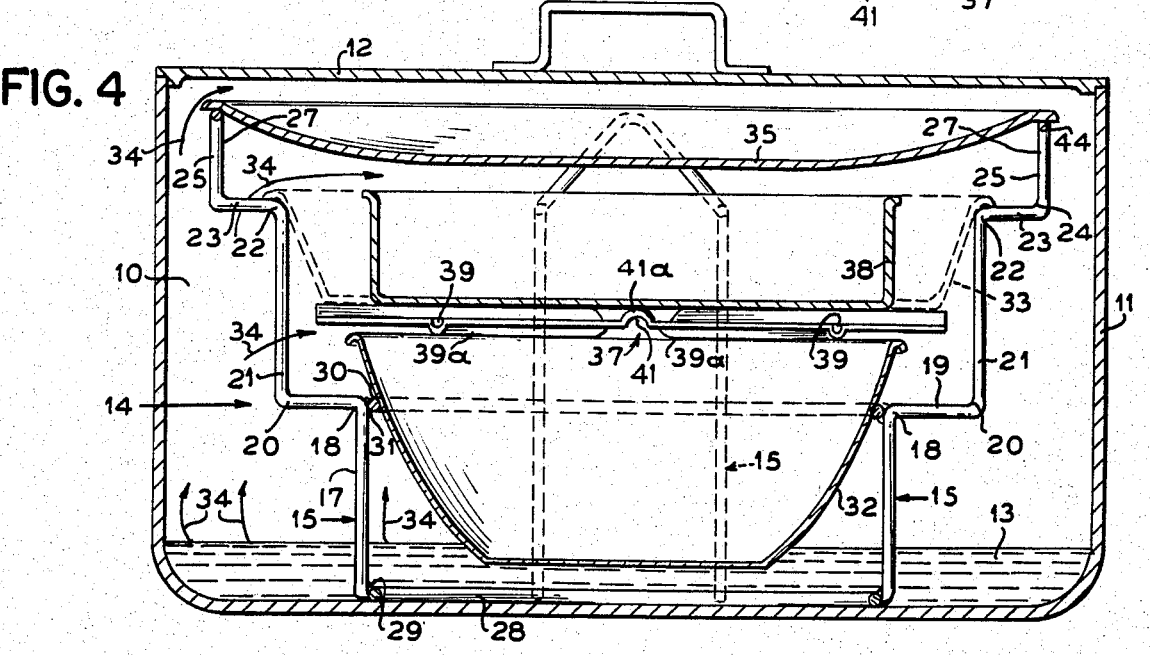
FIG. 4 is a vertical sectional detail view similar to FIG. 1 drawn on a larger scale and showing how the rack is adapted to be utilized in supporting diverse sizes and shapes of cooking receptacles in the assembly.

Referring to FIGS. 1 and 4, a food cooking steam chamber 10 is adapted to be provided within a steam generating vessel 11 which is generally representitive of any suitable vessel for this purpose, such as, but not limited to, a stock pot, steam pot, Dutch oven, wok with a high dome cover, a bun warmer, or the like, and provided with an opening closed by an openable, that is replaceable lid or closure 12. Such vessels may be on the order of nine inches or more in diameter and a height of five inches or more from the bottom to the cover. Within the bottom of the vessel 11 a body of water 13 is adapted to be boiled by means of heat applied externally to the bottom for generating cooking steam within the chamber 10.

For supporting cooking receptacles at a plurality of elevations in the chamber 10, a new and improved open framework rack 14 is provided. Although any suitable moisture and heat resistant material may be used in fabricating the rack 14, stainless steel wire of suitable gauge is a preferred material. In a desirable construction, the rack 14 comprises a plurality, herein four, risers 15 all of which for manufacturing economy may be of identical construction and of generally inverted U-shape. Each of the risers 15 may comprise a pair of spaced vertical legs 17 extending upwardly to a preferred length and joined at an angular shoulder bend 18 to an angular terrace structure provided by an offsetting projection 19 joined by an angular juncture 20 to an upstanding arm portion 21. The legs 17 and the arm portions 21 may be of about the same length and the connecting terrace projections may be on the order of half of the length of the leg and arm portions. At their upper ends, the arm portions 21 are joined on shoulder bends 22 to upper angular, offsetting terrace structure projections 23 which may be somewhat shorter than the terrace projections 19. Juncture bends 24 join the terrace projections 23 to the lower ends of upright arms 25 of an ear yoke 27 by which the two generally upright parts of each of the risers 15 are connected together in spaced parallel relation to one another.

For connecting the risers 15 in preferably circumferentially equidistantly spaced relation about a central axis, a first ring member 28 is secured as by means of brazing or welding 29 (FIG. 4) to the lower ends of the legs 17 and with the lower end extremities of the legs slightly above the lower face of the ring 28 so that the ring 28 serves as a stable base for the rack. Structural integrity for the rack framework is further assured by means of a second connecting ring 30 secured as by means of brazing or welding 31 to the upper ends of the legs 17 adjacent to the offsetting bends 18. For manufacturing economy, the rings 28 and 30 may be of identical diameter, and the ring 30, similarly as the ring 28 secured to the inner sides of the legs 17, or, stated another way, the legs 17 may be secured to the outer sides or perimeters of the rings 29 and 30.

As thus constructed, the rack 14 provides generally upwardly facing first shoulder means at the offsetting bends 18 and the ring 30, so that a relatively narrow cooking receptacle 32 is adapted to be supported within the rack 14. On the other hand, a relatively wider cooking receptacle 33 is adapted to be supported by second shoulder means provided by the offsetting bends 22 at an elevation above the narrow cooking receptacle 32.

If, as shown, the narrow receptacle 32 has an upper end part 32a which extends to a greater width than the shoulder means on which it rests, such upper end part is adapted to be accommodated in the space above the radially outward offsetting terrace structure 19, as best seen FIGS. 1 and 4. It will be appreciated that the terrace structure 19 by virtue of the smaller width of the lower portion of the rack 14 as compared to the greater width of the upper portion of the rack, provides for accommodating, by overhanging the terrace structure 19, a substantial range of top widths of the receptacle 32 supported on the first or lower shoulder means 18, 30 on which this receptacle is supported. Further, if desired a casserole, dish or pan may be supported directly on its bottom on the terrace structure 19 or the terrace structure 23.

Depending upon its depth, the receptacle 32 may or may not dip at its lower end into the body of steam generating water 13. In any event, steam 34 indicated schematically by directional arrows will sweep the wall of the receptacle 32 above the water body 13 in heat transfer relation and fill the steam chamber 10 and move over the rim of the receptacle and into heat tranfer contact with food to be cooked in the receptacle. Thereby, the food is substantially uniformly cooked by the cooking heat carried by the water or the steam over the entire surface of the food, that is, not only the surface which is an engagement with the inside of the receptacle 32 but also the surface exposed toward the open top of the receptacle.

Selection of the depth of the upper cooking receptacle 33 should desirably be such that its bottom remains spaced from the rim of the lower receptacle 32 so that there is a gap between the bottom of the receptacle 33 and the top of the receptacle 32 through which the steam 34 may pass into the open top of the receptacle 32 and also into heating engagement with the bottom of the upper receptacle 33. In addition, of course, the steam 34 engages in heat transfer relation with the outer wall of the receptacle 33, and in the space between the cover 12 and the top of the receptacle 33 moves into heat transfer relation to food within the upwardly opening receptacle 33.

Figure 5:
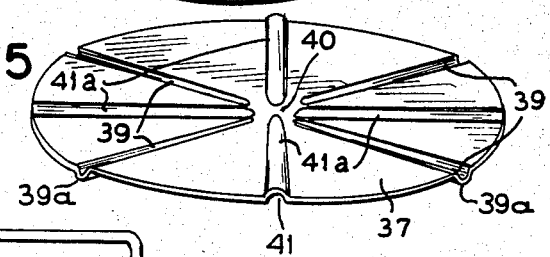
FIG. 5 is a perspective view of an adapter, a suggested use for which is illustrated in FIG. 4.

In addition to the receptacles 32 and 33, the rack 14 is adapted to support a third food supporting and cooking receptacle 35 (FIG. 4) which, as shown, may comprise a pan, for instance of the wok type, of a greater width than the receptacle 33 and adapted to rest at its rim on the upper ends of the yokes 27 providing third supporting shoulder means for this purpose. The steam 34 moves in heat transfer relation not only with the bottom of the receptacle 35 but also moves up and over the receptacle 35 in the space between such receptacle and the cover 12 for heat transfer relation to the top of the food supported in the receptacle 35. Thus the rack 14 has a three tier cooking capability.

Where it is desired to cook food in a plurality of receptacles which are only of a width that may be supported on the lowermost shoulder means of the rack 14, an adapter 37 (FIGS. 4 and 5) may be employed for supporting a receptacle 38 of the narrower type on the rim of the lower relatively narrow receptacle 32. In a desirable construction, the adapter 37 comprises a disk plate which has a plurality, in this instance four, channels 39 indented in one face of the adapter panel and radiating equidistantly relative to one another from a center 40, with ends of the channels opening through the edge of the panel. In addition, channels 41 are indented in the opposite face of the panel intermediate the channels 39 and also radiating from the center 40 and opening through the edge of the panel. This provides a strong deflection and damage resistant, lightweight structure which may be stamped from suitable metal such as aluminum or stainless steel, or may be economically formed from a plastic material which is heat resistant stable well above the heat transfer temperature that may be expected in the steam 34. It will be understood, of course, that where the cover 12 is secured against lifting under steam pressure, as in a pressure cooker, the steam temperature may reach a higher temperature than the 212° F. at which steam is normally produced as by heating the water body 13 in the bottom of the vessel 11 and where the lid 12 lies loosely on the rim of the vessel 11.

By having the panel 37 of greater diameter than the width of the lowermost shoulder means 18, 30 of the rack 14, the panel 37 is adapted to be engaged upon such shoulder means or upon the rim of the cooking receptacle 32, for in either position supporting the cooking receptacle 38.

Ribs 39a provided by formation of the channels 39, and ribs 41a provided by formation of the channels 41 serve as spacers maintaining the receptacles engaged with the adapter panel in spaced relation to the panel. There is ample access of steam to the receptacles in the spaces between the opposite faces of the adapter plate and the engaged surfaces of the receptacles. For example, in FIG. 4, the ribs 41a maintain spacing between the plate 37 and the bottom of the receptacle 38. On the other hand, the ribs 39a maintain a spaced relation between the face of the plate 37 and the rim of the receptacle 32. This spaced relation permits free movement of steam into the top of the lower receptacle 32 and across the bottom of the receptacle 38. As the adapter plate 37 heats up, heat is adapted to radiate therefrom into the lower receptacle 32 and toward the bottom of the receptacle 38. Any condensate on the face of the adapter plate 37 which faces upwardly is adapted to flow by way of the upwardly facing channels, whether they be the channels 39 or the channels 41, and drained back to the body of water 13, thus being deflected away from and not dripping into the underlying receptacle. To enhance such drainage action, the troughs provided by the channels 39 and 41 may be constructed to slope toward the edge of the adapter plate 37. Such slope may be of such small degree that it is hardly perceptible in FIG. 4. In any event, condensate that may form on the bottom of a pan superimposed upon the adapter plate 37 will be shunted away from the underlying receptacle.

Of course, if desired the adapter 37 may be used to support a cooking receptacle as a spacer directly on the bottom of the vessel 11, and thereby not only avoid boiling water agitation of the receptacle but also assure substantially complete exposure of the hot water to the bottom of the receptacle.

Sometimes for Chinese cooking it may be desired to arrange a stack of small shallow bowls one above the other within the steam chamber 10. In such event, a set of a plurality of the adapters 37 may be employed. One of the adapters 37 may support the lowermost bowl on the bottom of the vessel 11 or on the first shoulder 18, 30 of the rack 14. Then each succeeding bowl is adapted to be supported on the top of the subjacent bowl by means of another of the adapters 37. If the uppermost of the bowls is unduly spaced from the lid 12, another of the adapters 37 may be placed upon the top of the uppermost bowl to serve as a steam deflector for diverting the steam into the top of the uppermost bowl and for catching and deflecting any condensate that may drip down from above. It will thus be apparent that the adapters 37 provides a very useful and versatile implement for steam cooking procedures.

Although the riser yokes 27 may serve directly as handle ears for manipulating the rack 14, if preferred a handle bail 42 (FIG. 3) may be provided for such manipulation. Hooks 43 at opposite ends of the bail arms are adapted to engage removably with the undersides of the top connecting yokes 27 of diametrically opposite risers 15. For assuring centered engagement of the bail hooks 43 with the yokes 42, the yokes may be provided with upwardly arched tops provided with respective centered peaks 44 defining on their undersides downwardly facing centering bights 45 for the bail hooks 43 and into which the bail hooks are automatically biased by the convergence of the lower surfaces of the yoke tops toward the bights 45. It will be appreciated that engagement of the bail arm hooks 43 with the ear yokes 27 may be effected with great ease.

Figure 2:
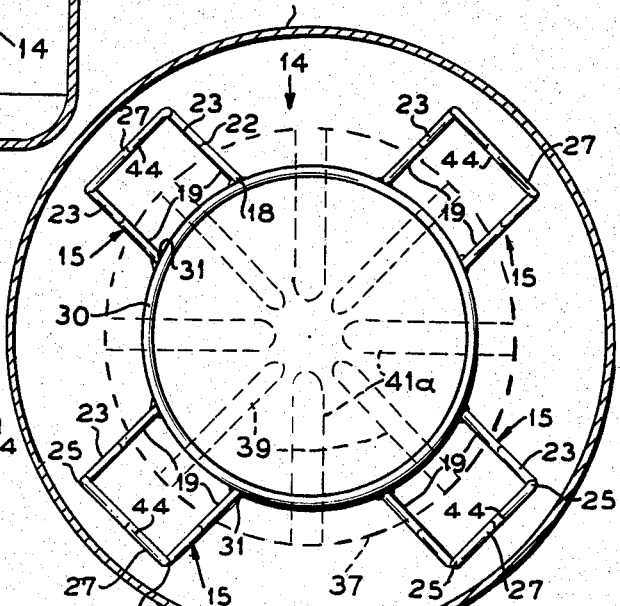
FIG. 2 is a horizontal sectional plan view taken substantially along the line II—II of FIG. 1.
Figure 3:
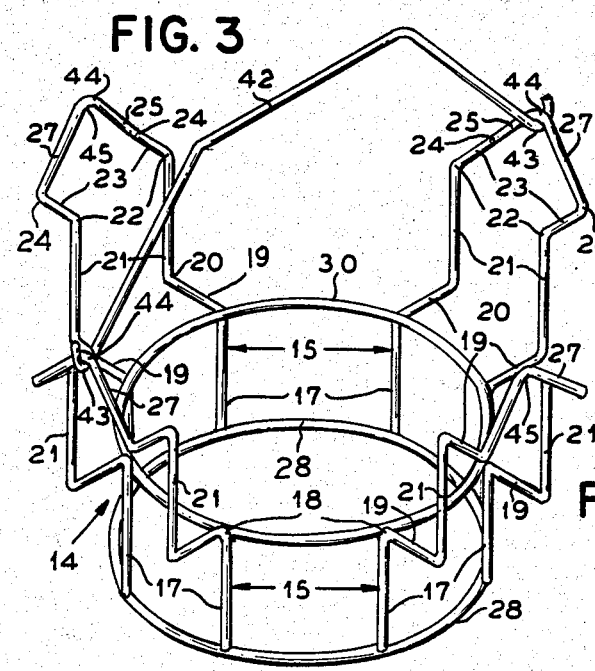
FIG. 3 is a perspective view of the rack.

By virtue of the substantial spacing between the risers 15 and the substantial upwardly free clearance spaces above the upper ring member 30, as readily apparent from FIGS. 2 and 3, easy access is permitted for manipulation of the food containing cooking receptacles 32, 33, 35, and 38, or others, or the adapter 37, relative to the rack 14, either for placing them in the rack or removing them from the rack, even when the rack is down within the steam chamber vessel 11.

It will be understood that variations and modifications may be effected without departing from the spirit and scope of the novel concepts of this invention.

I claim as my invention:

1. A cooking receptacle support for use within a steam cooking chamber comprising:

an open framework rack of a height for supporting cooking receptacles at a plurality of elevations in said chamber;

said rack having an intermediate terrace structure providing generally upwardly facing first shoulder means of substantially smaller width than an upwardly extending substantially larger width portion of the rack which leaves a clear space above said terrace structure;

said rack having substantially wider upwardly facing second shoulder means provided by said larger width portion of the rack;

said first shoulder means having a plurality of support surfaces substantially equidistantly disposed around a perimeter of said first shoulder means for stably supporting a relatively narrow cooking receptacle such that said narrow cooking receptacle cannot tip;

said second shoulder means having a plurality of support surfaces substantially equidistantly disposed around a perimeter of said second shoulder means in registry with said support surfaces of said first shoulder means for stably supporting a relatively wider cooking receptacle such that said wider cooking receptacle cannot tip at an elevation above said narrow cooking receptacle, and if an upper end part of said narrow receptacle extends to a greater width than said first shoulder means such upper end part is accomodated in said space above said terrace structure, or a cooking receptacle having a flat base may be supported on said base directly on said terrace structure;

said first shoulder means having at a smaller width thereof an upwardly facing ring member fixedly connected thereto for providing structural integrity for the rack and for receiving and supporting a cooking receptacle of increasing diameter for maintaining said receptacle spaced from a bottom of said chamber;

and said support maintaining open spaces for steam circulation on all sides of each cooking receptacle supported thereby.

2. A cooking receptacle support according to claim 1 wherein said rack has upwardly facing third shoulder means wider than said second shoulder means and located at a substantially higher elevation, whereby the rack is adapted for supporting progressively wider cooking receptacles in three different tiers provided by said first, second and third shoulder means, said third shoulder means providing upwardly extending yokes affording manipulating ears for the rack, and said yokes having downwardly facing central bights defined by upwardly converging surfaces and facilitating reception of arms of a removable handle bail.

3. A cooking receptacle support according to claim 1, wherein said rack comprises a plurality of similarly constructed circumferentially spaced risers providing said shoulder means and each of which has a lower end and an upper end, a second ring member of the same diameter as said ring member and connecting the lower ends of said risers in circumferentially spaced relation about the second ring member.

4. A cooking receptacle support according to claim 3, wherein each of said risers comprises a wireform of generally inverted U-shape having legs attached at lower straight ends to the outer diameter of and above the lower face of said second ring member so that said second ring member serves as a stable base for the rack.

5. A cooking receptacle support according to claim 4, wherein said terrace structure comprises angularly bent portions of said wireform risers which have angular shoulders at the smallest width of the terrace structure, and said ring member being secured to said shoulders.

6. A cooking receptacle support according to claim 5, wherein said risers have integral connecting yokes formed with upwardly convergent peaks at their upper ends adapted to serve as third shoulder means for supporting a cooking receptacle wider than the receptacle adapted to be supported by said second shoulder means.

7. A cooking receptacle support according to claim 6, wherein said yokes have means downwardly facing bights to facilitate carrying the rack by engagement of the yokes with arms of a removable handle bail.

8. A cooking receptacle support according to claim 1 further comprising for use in combination with said rack an essentially flat cooking receptacle supporting adapter plate having upper and lower faces, and alternating upwardly and downwardly projecting channel ribs in said faces and radiating from a center, said adapter extending to a greater diameter than the width of said first shoulder means and being placed between cooking receptacles for supporting an upper cooking receptacle on a lower cooking receptacle and maintaining open spaces for steam circulation therebetween.

9. A cooking receptacle support according to claim 8 wherein said adapter plate consists of sheet metal.

10. A cooking receptacle support according to claim 8 wherein said adapter plate consists of heat and moisture resistance plastic.

11. A cooking receptacle support according to claim 1 wherein said steam chamber in which said rack is disposed has a vertical chamber wall topped by an access opening with an openable closure for retaining the steam within the chamber and permitting access to said rack when the closure is opened, and wherein said rack is of smaller diameter at its widest dimension than the inside diameter of said wall and has food cooking receptacles of different diameters supported on said shoulder means, said receptacles being in spaced relation to one another and the wider of the cooking receptacles being of smaller diameter than said wall and spaced from said closure so that steam within said chamber will substantially uniformly contact in cooking heat transfer relation said receptacles and food contained in all of the receptacles.

12. A cooking receptacle support according to claim 11, wherein said rack has third shoulder means wider than said second shoulder means and being of smaller diameter than said chamber wall, and a third receptacle wider than said wider cooking receptacles and being of smaller diameter than said chamber wall and supported on said third shoulder means in spaced relation to said closure and said chamber wall.

* * * * *